US012563149B2

(12) United States Patent
Liss et al.

(10) Patent No.: US 12,563,149 B2
(45) Date of Patent: Feb. 24, 2026

(54) DYNAMIC EMERGENCY RESPONSE COORDINATION USING PROGRESSIVE AREA EXPANSION

(71) Applicant: Counslr, Roslyn, NY (US)

(72) Inventors: Joshua Liss, Dix Hills, NY (US); Roy Reichbach, Waxhaw, NC (US); Tyler Fisher, Melville, NY (US)

(73) Assignee: Counslr, Roslyn, NY (US)

( * ) Notice: Subject to any disclaimer, the term of this patent is extended or adjusted under 35 U.S.C. 154(b) by 0 days.

(21) Appl. No.: 19/234,480

(22) Filed: Jun. 11, 2025

(65) Prior Publication Data

US 2025/0358372 A1     Nov. 20, 2025

Related U.S. Application Data

(63) Continuation of application No. 18/777,149, filed on Jul. 18, 2024.

(60) Provisional application No. 63/514,206, filed on Jul. 18, 2023.

(51) Int. Cl.
| | |
|---|---|
| *H04M 11/04* | (2006.01) |
| *H04M 7/00* | (2006.01) |
| *H04W 4/90* | (2018.01) |
| *H04W 84/12* | (2009.01) |

(52) U.S. Cl.
CPC ........... *H04M 11/04* (2013.01); *H04M 7/006* (2013.01); *H04W 4/90* (2018.02); *H04W 84/12* (2013.01)

(58) Field of Classification Search
CPC ........ H04M 11/04; H04M 7/006; H04W 4/90; H04W 84/12
See application file for complete search history.

(56) References Cited

U.S. PATENT DOCUMENTS

| | | | | | |
|---|---|---|---|---|---|
| 5,960,337 | A | * | 9/1999 | Brewster | ................ A61K 31/02 |
| | | | | | 600/523 |
| 2008/0188198 | A1 | * | 8/2008 | Patel | ................... G06F 21/6245 |
| | | | | | 455/404.2 |
| 2011/0071880 | A1 | * | 3/2011 | Spector | ................. H04W 76/50 |
| | | | | | 340/539.13 |
| 2013/0023229 | A1 | * | 1/2013 | Messerly | .............. H04W 4/023 |
| | | | | | 455/404.2 |
| 2015/0038107 | A1 | * | 2/2015 | Messerly | .............. H04W 64/00 |
| | | | | | 455/404.2 |
| 2023/0186754 | A1 | * | 6/2023 | Menahem | ............ G08B 25/006 |
| 2023/0234536 | A1 | * | 7/2023 | Yamagata | ............... B60R 25/25 |

* cited by examiner

*Primary Examiner* — Mazda Sabouri
(74) *Attorney, Agent, or Firm* — Perkins Coie LLP

(57) ABSTRACT

The technology provides a system that allows for a first user (e.g., counselor) located far away from a second user (e.g., at-risk user) to easily contact the second user. The first user can provide an emergency response including an emergency service nearest to the location of the second user. The system searches for the nearest emergency service based on a selected area of a predetermined zone where the second user is located. Where there are no emergency services located in the selected area, the system successively searches expanded areas corresponding to predetermined zones for an emergence service until there is an emergency response. The system automatically updates the selected area for successively expanded predetermined zones for each instance where no emergency response is received in response to the search request.

20 Claims, 5 Drawing Sheets

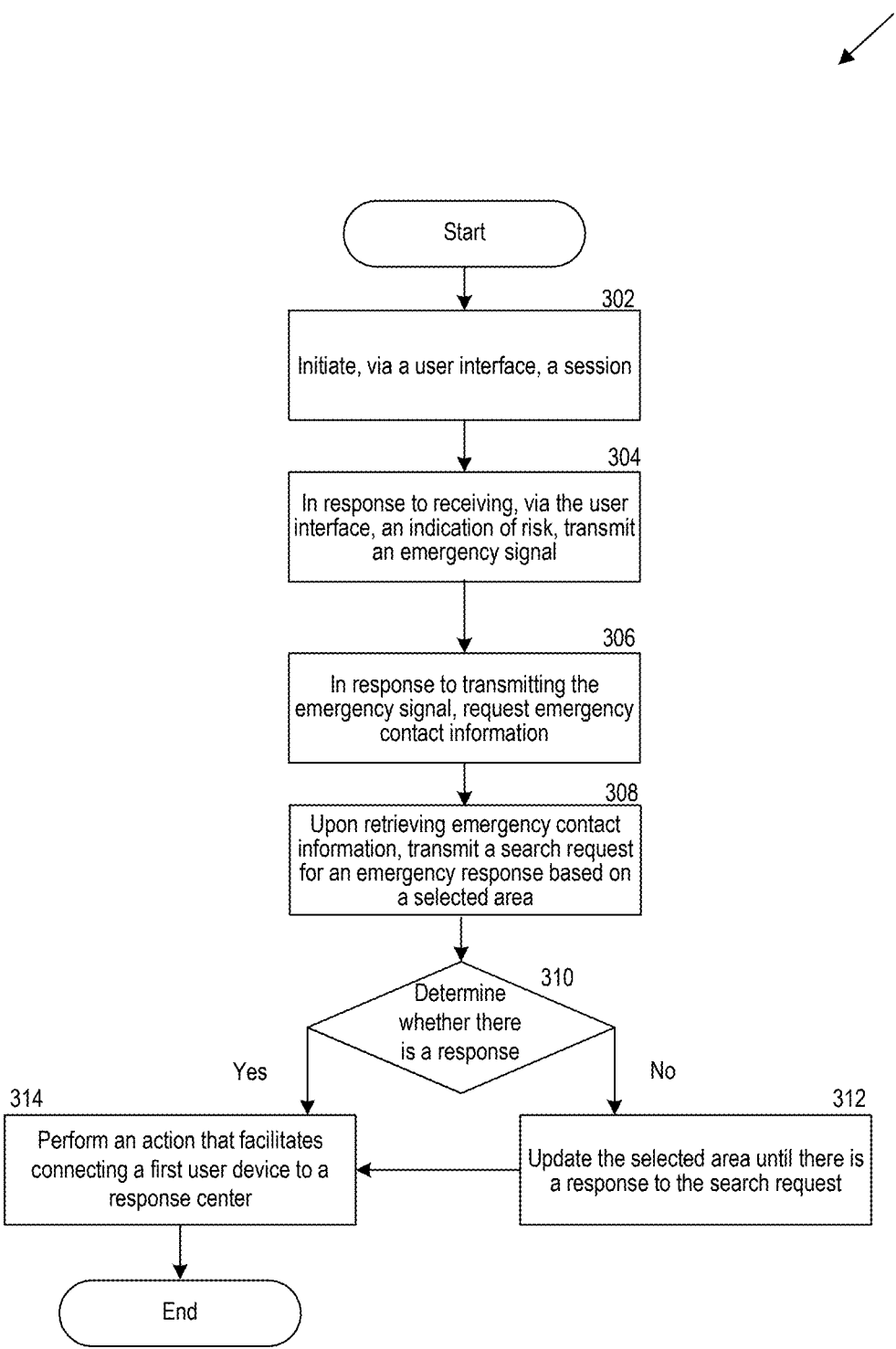

300

Start

302

Initiate, via a user interface, a session

304

In response to receiving, via the user interface, an indication of risk, transmit an emergency signal

306

In response to transmitting the emergency signal, request emergency contact information

308

Upon retrieving emergency contact information, transmit a search request for an emergency response based on a selected area

310

Determine whether there is a response

Yes

No

314

Perform an action that facilitates connecting a first user device to a response center

312

Update the selected area until there is a response to the search request

End

DYNAMIC EMERGENCY RESPONSE COORDINATION USING PROGRESSIVE AREA EXPANSION

CROSS-REFERENCE TO RELATED APPLICATIONS

This application is a continuation application of U.S. patent application Ser. No. 18/777,149, filed on Jul. 18, 2024, and titled "DYNAMIC EMERGENCY RESPONSE COORDINATION USING PROGRESSIVE AREA EXPANSION," which claims priority to U.S. Provisional Application No. 63/514,206, titled "COUNSELOR SYSTEM CONFIGURED TO CONNECT AT-RISK USER TO EMERGENCY SERVICE BY SEARCHING SELECTED AREA" filed on Jul. 18, 2023. The entire contents of which are herein incorporated by reference in their entireties.

TECHNICAL FIELD

The disclosed teachings generally relate to emergency features for communications services.

BACKGROUND

A public-safety answering point (PSAP), sometimes called public-safety access point, is a call center where emergency/non-emergency calls (e.g., police, fire department, ambulance) initiated by any landline, mobile device, or Voice Over Internet Protocol (VOIP) subscriber are terminated. The PSAP is a call center in almost all countries, including Canada and the United States, responsible for answering calls to an emergency telephone number for police, firefighting, and ambulance services. Trained telephone operators are also usually responsible for dispatching these emergency services.

The emergency services and rescue services are organizations that provide public safety, security, and health assistance by addressing and resolving different emergencies. Some of these agencies exist solely for addressing certain types of emergencies, while others deal with ad hoc emergencies as part of their normal responsibilities. In one example, when an emergency code is dialed, logic can be implemented by mobile or network operators to route the call to the nearest police station.

BRIEF DESCRIPTION OF THE DRAWINGS

Detailed descriptions of implementations of the present invention will be described and explained through the use of the accompanying drawings.

FIG. 3 is a flowchart that illustrates a method for generating an emergency response based on a dynamically and progressively expanded area.

Figure 1:
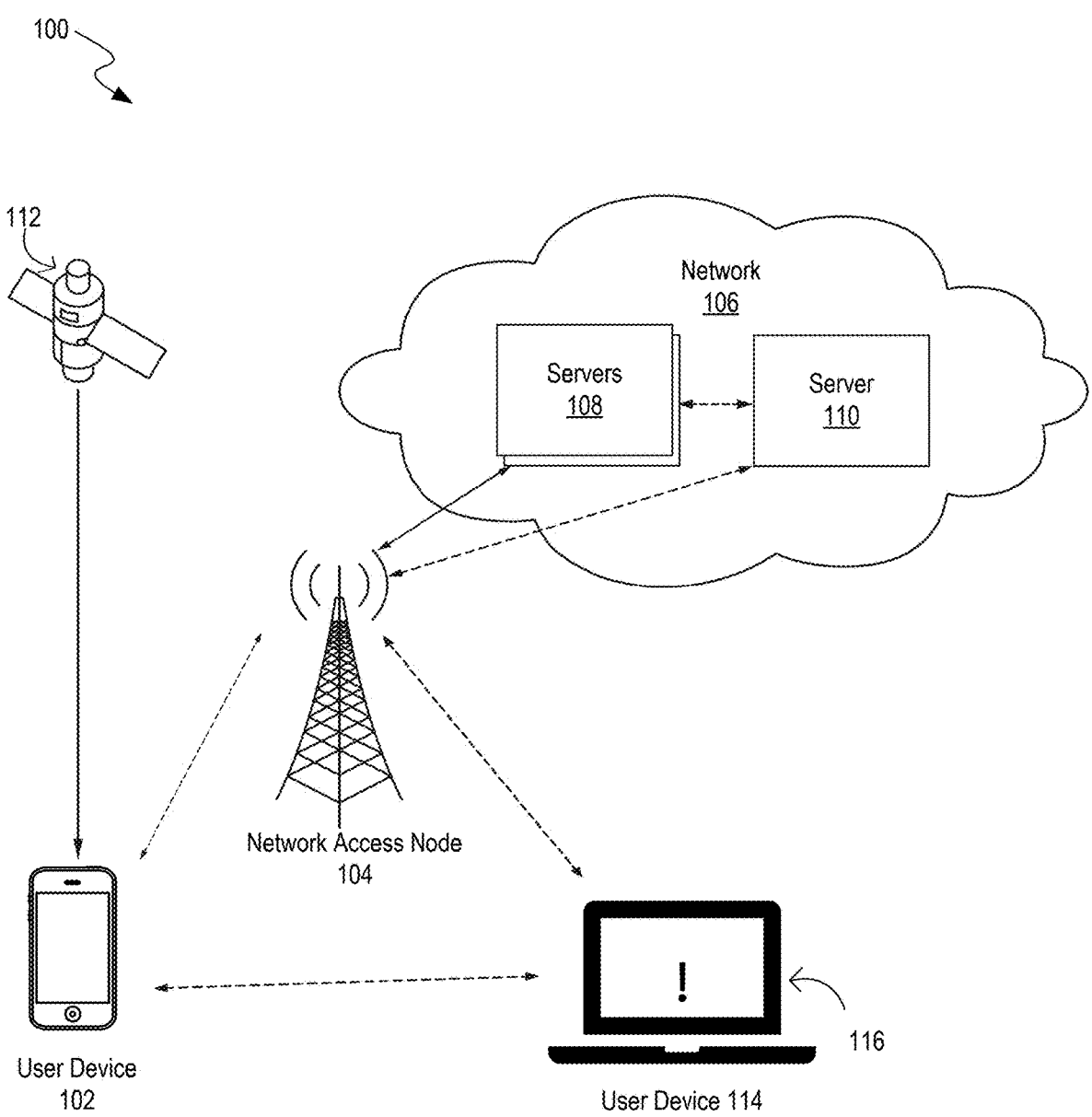
FIG. 1 is a schematic diagram that illustrates a system for generating an emergency response in a dynamically and progressively expanded area.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The proposed emergency response system aims to revolutionize the current 911 system by leveraging advanced technology to enhance speed, accuracy, and efficiency in critical situations. The system is designed to connect at-risk users to the nearest emergency services by dynamically and progressively expanding the search area until a suitable emergency service provider is identified. This approach ensures timely and accurate emergency assistance, significantly reducing response times.

The system comprises several key components: user devices, network access nodes (NANs), a network infrastructure, servers, and potentially satellites for non-terrestrial communication. User devices, which can be smartphones, tablets, laptops, or desktop computers, communicate with NANs, such as wireless wide area network (WWAN) base stations or wireless local area network (WLAN) access points. These NANs serve as intermediaries, facilitating the communication between user devices and the broader network infrastructure, ensuring seamless connectivity and data transmission.

When a counselor identifies an imminent threat, they can activate the SOS system by clicking an SOS button on their platform. This action triggers a confirmation prompt to prevent accidental alerts. Upon confirmation, the system sends an email to the admin team, notifying them of the SOS activation without revealing any user information. This allows the admin team to support the counselor and ensure proper procedures are followed. The confirmation prompt is a critical step in preventing false alarms, ensuring that the system is only activated in genuine emergencies.

The SOS panel that appears on the counselor's screen is equipped with live location tracking, showing the user's real-time location. This location is displayed both as a map view and as the best estimate of the two nearest cross streets. This dual display helps the counselor quickly understand the user's precise location, which is essential for directing emergency responders accurately. The map view provides a visual representation of the user's location, while the cross streets offer a textual reference, making it easier for emergency responders to navigate to the scene.

The system provides three emergency service numbers closest to the user's location. These numbers are not just any emergency contacts; they are the three geographically closest public service access points, such as local 911 responders, to the user's current location. This targeted approach ensures that the counselor can bypass the traditional 911 system, which would typically route a call through multiple layers of regional dispatch centers, causing delays. By directly connecting to the nearest emergency services, the system minimizes the time taken to reach the user, which can be crucial in life-threatening situations.

If the initial emergency service numbers provided are unavailable or out of service, the counselor is instructed to try the second and third numbers. This redundancy ensures a high likelihood of reaching an appropriate emergency responder quickly. The system also employs a dynamic and progressive search mechanism. If the initial search within a narrow zone (e.g., based on the user's zip code) does not yield results, the system expands the search to broader zones until a suitable emergency service provider is identified. This ensures that the user is connected to the nearest available emergency service as quickly as possible, even in areas with limited emergency service coverage.

The system can integrate artificial intelligence (AI) to further enhance the emergency response. AI can shadow chat sessions between counselors and at-risk users, analyzing the dialogue in real-time to detect signs of distress or imminent threats. This capability allows the AI to act swiftly, potentially engaging with emergency services faster than a human counselor could. In high-risk situations, the AI can automatically contact emergency services, sending out an emergency signal and providing the necessary information to the nearest emergency service provider. The AI's ability to analyze conversations in real-time ensures that no signs of distress are missed, providing an additional layer of safety for the user.

In scenarios where the human counselor is occupied, such as when they are on the phone with 911, the AI can provide continuous support to the user. The AI can engage with the user, offering support and reassurance to ensure they do not feel abandoned or neglected during a critical moment. This continuous engagement helps stabilize the user's emotional state and provides them with a sense of security until human intervention is available. The AI's ability to maintain communication with the user ensures that they are never left alone during a crisis, which can be crucial for their mental and emotional well-being.

The technical implementation of the system involves several steps. User devices communicate with NANs, which interface with the network infrastructure. The network includes servers that manage and control security services, user authentication, access authorization, tracking, and IP connectivity. The servers play a crucial role in ensuring the security and integrity of the system, protecting user data and maintaining the confidentiality of communications.

The system uses location services enabled on the user's device to track their real-time location. This information is displayed on the SOS panel as a map view and the best estimate of the two nearest cross streets. The location tracking feature is essential for providing accurate information to emergency services, ensuring that they can reach the user as quickly as possible. The system's ability to provide both a visual map and textual cross streets ensures that emergency responders have all the information they need to navigate to the user's location.

The system accesses a comprehensive database of direct emergency services phone numbers across the United States. This database allows for quick identification and connection to the appropriate local emergency services. The database is regularly updated to ensure that the contact information is accurate and up-to-date, minimizing the risk of connecting to outdated or incorrect numbers.

The system employs a dynamic and progressive search algorithm to find the nearest emergency service provider. If no emergency services are located in the initially selected area, the system successively searches expanded areas until an emergency response is found. This ensures that the user is connected to the nearest available emergency service, even in remote or underserved areas. The dynamic search algorithm is designed to be efficient and responsive, minimizing the time taken to identify and connect to an emergency service provider.

AI monitors chat sessions between counselors and users, analyzing the dialogue for signs of distress. In high-risk situations, the AI can automatically contact emergency services and provide continuous support to the user. The AI's ability to analyze conversations in real-time ensures that no signs of distress are missed, providing an additional layer of safety for the user. The AI's continuous support ensures that the user is never left alone during a crisis, which can be crucial for their mental and emotional well-being.

By integrating these features, the system enhances the speed and accuracy of emergency responses, ensuring that at-risk users receive timely and appropriate assistance in critical situations. The combination of live location tracking, direct emergency service numbers, dynamic search capabilities, and AI-driven enhancements creates a robust and efficient emergency response system. This system significantly reduces the time it takes to connect users with the help they need, potentially saving lives and improving outcomes in emergency situations. The system's ability to provide accurate and timely information to emergency services ensures that users receive the help they need as quickly as possible, improving their chances of survival and recovery.

FIG. 1 illustrates a comprehensive system 100 designed to generate an emergency response based on a selected area. This system integrates various components, each playing a crucial role in ensuring seamless communication and efficient emergency response.

At the core of the system are user devices, represented by user device 102 and user device 114. These devices can take multiple forms, including wireless devices, handheld mobile devices, remote devices, mobile terminals, wireless terminals, remote terminals, laptops, smartphones, tablets, or desktop computers. For instance, a user device 102 could be a smartphone used by a person in distress, while user device 114 could be a tablet used by emergency responders. These devices are equipped with various sensors and communication modules, such as GPS for location tracking, accelerometers for motion detection, and cellular or Wi-Fi modules for connectivity. The user devices can send and receive data, voice, and video signals, making them versatile tools in emergency situations.

The network access node (NAN) 104 is a pivotal component in this system. It can be referred to as a cell site, base transceiver station, or radio base station. The NAN 104 serves as a bridge between user devices and the broader network. It can function as a wireless wide area network (WWAN) base station or a wireless local area network (WLAN) access point, such as an IEEE 802.11 access point. For example, in a city, the NAN 104 could be a cell tower facilitating communication between mobile phones and the network. The NAN 104 is responsible for managing radio resources, performing handovers between cells, and ensuring that data packets are correctly routed to their destinations. It also handles encryption and decryption of data to maintain secure communication channels.

The network 106 is another critical element, encompassing servers 108 and a server 110. This network is responsible for providing, managing, and controlling various services, including security services, user authentication, access authorization, tracking, IP connectivity, and other access, routing, or mobility functions. For instance, the servers 108 and server 110 could store user login credentials and other essential data, ensuring that only authorized users can access the system. The network 106 can also perform load balancing to distribute traffic evenly across servers, ensuring optimal performance and preventing any single server from becoming a bottleneck. Additionally, the network 106 can implement firewalls and intrusion detection systems to protect against cyber threats.

A unique feature of this system is its ability to enable both terrestrial and non-terrestrial transmissions. The inclusion of a satellite 112 allows the system to deliver services anywhere and anytime, providing coverage in areas that are otherwise unreachable by conventional terrestrial networks (TN). For example, in remote or rural areas where cell towers are sparse, the satellite 112 can ensure that emergency signals are still transmitted and received. The satellite 112 operates in various frequency bands, such as L-band, S-band, or Ka-band, to provide reliable communication links. It can also support different types of orbits, including geostationary, medium Earth orbit (MEO), and low Earth orbit (LEO), to offer a range of coverage options.

The system 100 also includes an emergency signal 116, which is crucial for initiating and managing emergency responses. When a user device 102 sends an emergency signal, it is transmitted through the NAN 104 to the network 106 and, if necessary, relayed via the satellite 112 to user device 114. This ensures that emergency responders receive timely and accurate information, regardless of their location. The emergency signal 116 can include various types of data, such as the user's location, medical information, and a description of the emergency. It can also trigger automated responses, such as alerting nearby emergency services or activating safety protocols.

The communication process within this system is designed to be robust and efficient. User device 114 can receive a set of signals from user device 102, which includes the location of user device 102. This is particularly useful in emergency situations where the precise location of the person in distress is critical. For example, if a hiker is lost in a remote area, their smartphone (user device 102) can send location signals to the NAN 104, which then relays the signals to the satellite 112. The satellite 112 transmits the signals to the emergency responders' tablet (user device 114), enabling them to locate and assist the hiker promptly. The system can also support real-time communication, allowing the hiker to speak directly with emergency responders and provide additional information about their situation.

Furthermore, user device 114 can initiate a communication session via a user interface, receiving feedback from user device 102. This feedback includes a message signal, which could contain vital information such as the nature of the emergency, the condition of the person in distress, and any other relevant details. For instance, during a natural disaster, a person could use their smartphone (user device 102) to send a distress signal and a message describing their situation. The emergency responders' tablet (user device 114) would receive this information, allowing them to coordinate an effective response. The system can also support multimedia messages, enabling users to send photos or videos of the emergency scene, providing responders with a clearer understanding of the situation.

Thus, the system 100 leverages both terrestrial and non-terrestrial technologies to ensure reliable communication and efficient emergency response. By integrating user devices, network access nodes, a comprehensive network, and satellite capabilities, this system is well-equipped to handle a wide range of emergency scenarios, providing critical support and connectivity when it is needed most. The system's ability to adapt to different environments and its robust security measures make it a reliable solution for emergency communication, ensuring that help can be provided quickly and effectively, regardless of the circumstances. Components of the user interface are described further herein with reference to FIGS. 2A-2C.

Figure 2A:
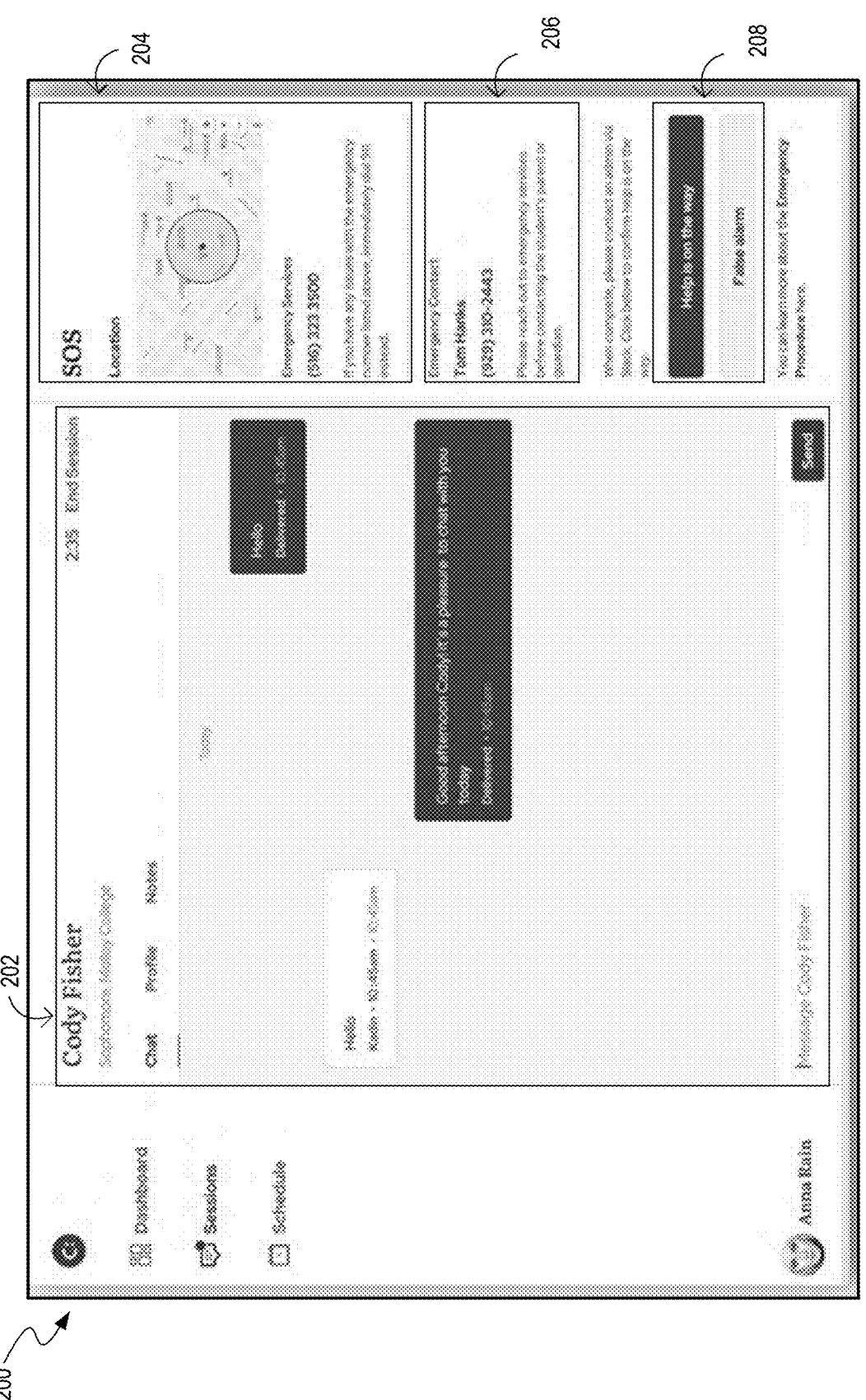
FIG. 2A-2C illustrate aspects of an interface of the system configured to initiates an emergency procedure flow.

FIG. 2A illustrates an interface 200 of the system that initiates a session between users. Interface 200 includes a chat component 202, an SOS component 204, an emergency contact 206, and a cancel button 208. For example, a first user can request a session with a second user. The second user then initiates the session using the user interface (e.g., interface 200) on their user device (e.g., user device 114). After initiating the session, interface 200 generates a text-based support (e.g., via the chat component 202) between the first user (e.g., patient) and the second user (e.g., licensed counselor).

In response to receiving, via the user interface (e.g., interface 200) at the user device 114, an indication of the first user being at risk, the second user device transmits an emergency signal. The second user detects the indication of risk based on the message signal from the first user device (e.g., user device 102). For example, the second user (e.g., licensed counselor) can access the first user based on the messages received through the chat component 202. Upon determining that the first user is at risk for harm, the second user can engage the SOS system by pressing the SOS button in the interface 200 (e.g., via the SOS component 204).

In one example, a popup is presented on the user interface to request confirmation from the second user regarding whether or not they intended to initiate an emergency procedure flow. By clicking yes, the SOS system sends out an emergency signal in accordance with the emergency procedure flow. In contrast, clicking no can cancel the emergency procedure flow, for example.

After transmitting the emergency signal, the user device 114 requests emergency contact information. The emergency contact information includes a name and number of a third-party contact (e.g., an emergency contact). For example, after transmitting the emergency signal, the second user device (e.g., user device 114) automatically requests emergency contact information for the first user from a database stored at the servers 108. The interface 200 presents the name and number for the emergency contact (e.g., emergency contact 206). This allows the counselor to inform the emergency contact about the situation.

Upon retrieving the emergency contact information, the user device 114 transmits a search request for an emergency response based on a selected area that includes the at-risk user. That is, the selected area includes a first predetermined zone associated with the location of the first user. For example, user device 114 transmits a search request for the nearest emergency services based on the location of the first user device (e.g., user device 102). The system can access a database of every direct emergency services phone number in the United States.

The search process includes progressive search operations that expand the area for searching for emergency services at the at-risk user's location. In one example, a first search operation is restricted to the narrowest zone that includes the at-risk user. The system can search for the nearest emergency service based on a predetermined zone within the location of the first user device (user device 102). For example, the system can first search for the nearest emergency service based on the zip code of the current location of user device 102. If a search result is not returned in response to a first search operation, a second search operation is performed in an expanded zone that includes the at-risk user. If, in response to a second search operation, a search result is again not returned, a third search operation is performed in a further expanded zone that includes the at-risk user, and so on until an emergency service is returned as a search result.

That is, the system determines whether there is a response to the search request for the first predetermined zone. If there is no response, the system will continue to search for an emergency service based on expanded predetermined zones. For example, user device 114 can update the selected area to another predetermined zone until a response includes search results for the search request. For example, the system will check the at-risk user's city to identify a phone number for an emergency services center within the city. Failing that, the system will identify an emergency number from within the user's county. Failing that, the system will identify a number from within the user's state.

After receiving a response, user device 114 can perform an action that facilitates connecting a first user device (user device 102) to an emergency service. In one implementation, the user device 114 displays, on the user interface of the second user device (e.g., interface 200), the response and emergency contact information (e.g., SOS component 204). The response includes a location of a local emergency center. In another implementation, the user device 114 causes a communications network (e.g., network 106) to establish a communications link between the first user device (e.g., user device 102) and a communications device of the emergency center using NAN 104.

In the case that the second user (e.g., licensed counselor) decides an emergency response is not needed, the interface 200 has an option for the counselor to cancel the emergency response by using the cancel button 208. Alternatively, the counselor can confirm that an emergency service is connecting to the first user. Other components, hardware, and/or software included in the system 100 that are well known to persons skilled in the art are not shown or discussed herein for brevity.

Figure 2C:
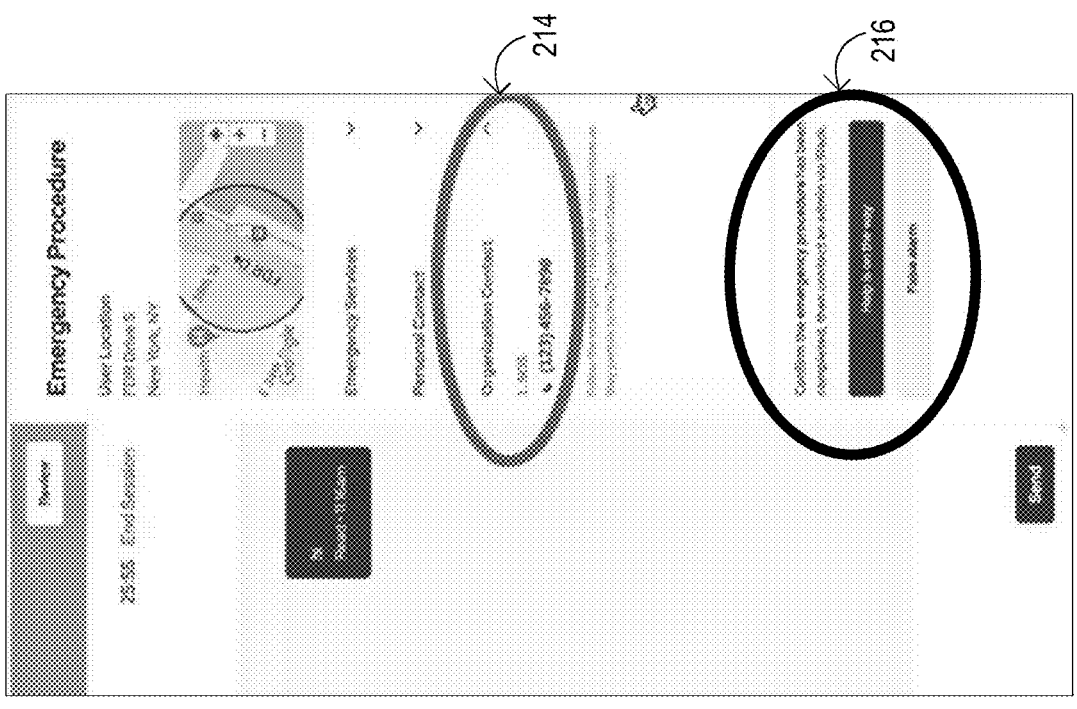
Figure 2B:
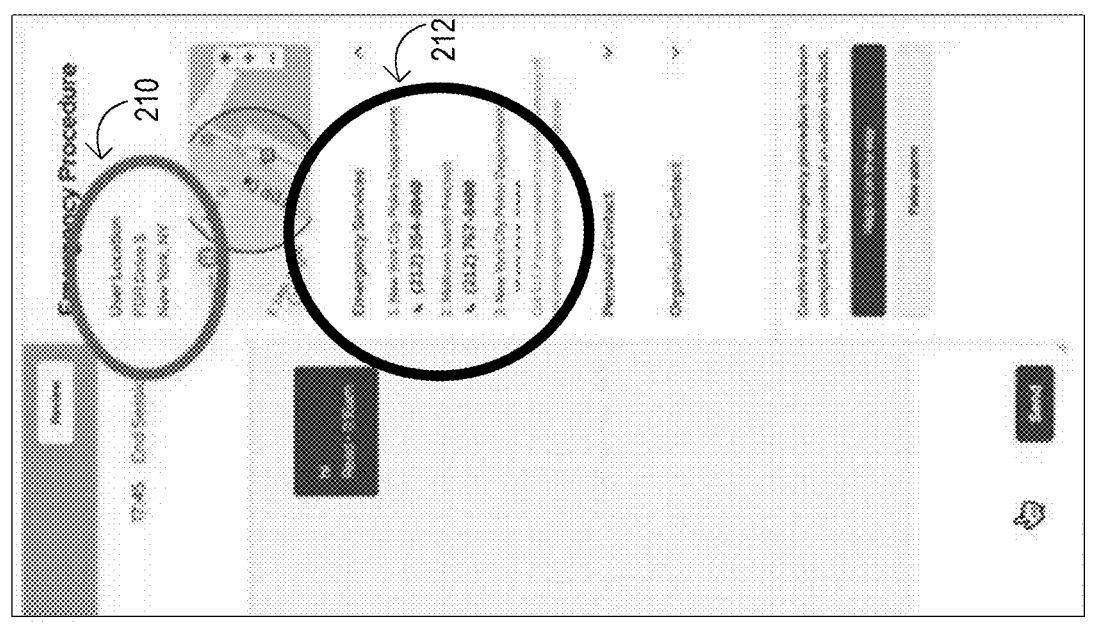

FIGS. 2B and 2C illustrate zoomed-in views of portions of the interface 200. At the top of the SOS panel, above a map, is a location display 210 of a current street, city and state of at which the first user is located. As such, the second user can view information about the location of the first user. An emergency services display 212 includes contact information for multiple emergency services that are located closest to the location indicated in the location display 210. As shown, the three closest emergency services that are ranked based on proximity to first user's location (e.g., closets ranked highest) are provided to the second user. The counselor should contact the number first for the top ranked emergency service. If any issues connecting to the first number arise, they should contact the next number, and so forth. 911 remains as the final fallback.

The organization contact information 214 is accessible from the SOS panel. Counselors can contact the organization on an as-needed basis, following instructions from the emergency operator. Lastly, the emergency procedure control 216 links to the emergency procedure available from the SOS panel, which can be accessed by clicking "emergency procedure" link. The emergency procedure control 216 includes alternative buttons for "Help is on the way" and "False Alarm."

FIG. 3 is a flowchart that illustrates a method for generating an emergency response based on searches of progressively expanding areas. At 302, the system 300 initiates, via a user interface, a communications session. Prior to initiating the session, the system receives, from a first user device, a set of signals. The first user device is associated with a first user. The set of signals comprises location information of the first user device. During the session, a second user device is associated with a second user. The second user device receives feedback from the first user device. The feedback includes a message signal. At 304, the system 300 responds to receiving a message signal, via the user interface, with an indication of risk and transmits an emergency signal.

The second user detects the indication of risk based on the message or the video signal from the first user device. At 306, the system 300 requests emergency contact information in response to transmitting the emergency signal. The emergency contact information includes a name and number of a third-party emergency contact. At 308, upon retrieving emergency contact information, the system 300 transmits a search request for an emergency service based on a selected area. The selected area comprises a first predetermined zone associated with the location of the first user. At 310, the system 300 determines whether there is a response to the search request for the first predetermined zone. At 312, upon not receiving a response, system 300 updates and expands the selected area to another predetermined zone, and so on, until there is a response to the search request.

At 314, upon receiving a response, the system 300 performs an action that facilitates connecting a first user device to a response center. In one implementation, the system 300 displays, on the user interface of the second user device, the response and emergency contact information. The response comprises a location of the response center. In another implementation, the system 300 causes a communications network to establish a communications link between the first user device and a communications device of the response center.

In some embodiments, the system can integrate AI (e.g., ML) to further enhance the emergency response. For example, an AI can shadow chat sessions between counselors and at-risk users, analyzing the dialogue in real-time to detect signs of distress or imminent threats. As used here, a "model" can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, an ML model can be a neural network with multiple input nodes that receive inputs from a chat. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to, for example, create a shadow chat. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

An ML model can be trained with supervised learning, where the training data includes natural language responses from users or counselors as input and a desired output, such as natural language responses. A representation of a chat can be provided to the model. Output from the model can be compared to the desired output for that chat and, based on the comparison, the model can be modified, such as by changing weights between nodes of the neural network or parameters of the functions used at each node in the neural network (e.g., applying a loss function). After applying each of the natural language inputs in the training data and modifying the model in this manner, the model can be trained to evaluate new inputs.

Computer System

Figure 4:
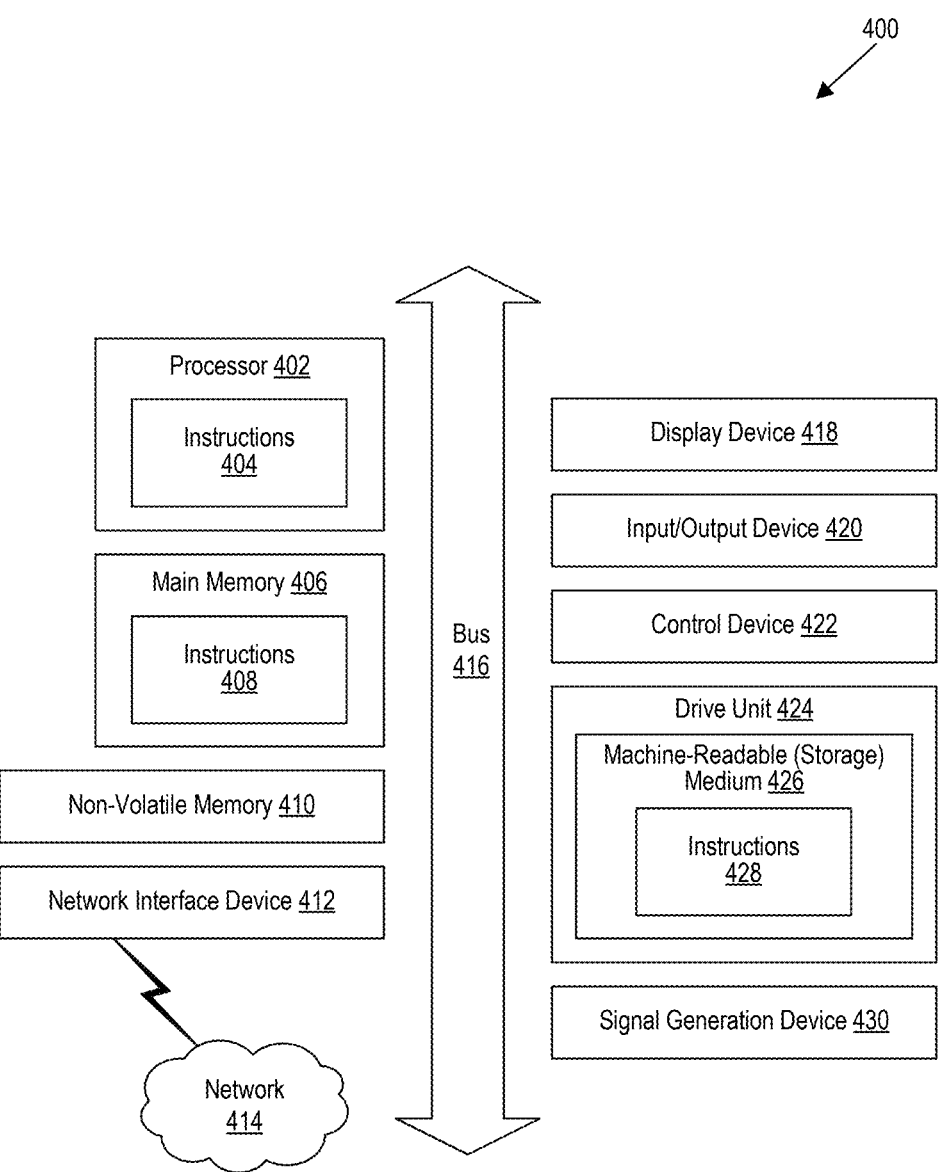
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

EXAMPLES

In some aspects, the techniques described herein relate to a method for a third-party device to cause a user device to connect to an emergency service proximate to the user device in communication with the third-party device, the method including: receiving a signal indicative of a location of the user device; initiating a communication session between the user device and the third-party user device, wherein the communication session includes a message indicating that a user of the user device is at risk of an emergency; generating an emergency signal in response to an input at the third-party device that the user is at risk of the emergency; in response to the emergency signal, ascertaining distances from locations of emergency services to the location of the user device, wherein a set of emergency services are identified as having emergency centers nearest the location of the user device, and wherein the set of emergency services is restricted to a predetermined area including the location of the user device; ranking the set of emergency services based on a geographic proximity to the predetermined area including the location of the user device, wherein the set of emergency services are ranked based on a respective nearest distance to the location of the user device; causing the third-party device to present, on a user interface, the ranked set of emergency services; and performing an action that facilitates connecting an identified emergency center of a particular emergency service of the ranked set of emergency services to the user device.

In some aspects, ascertaining distances from locations of emergency services to the location of the user device includes: in response to failing to identify a first emergency center in a predetermined zone of the predetermined area, iteratively changing or expanding predetermined zones associated with the location of the first user device, wherein next predetermined zones have areas different from a prior area of previously searched predetermined zones; returning a result that is restricted to an expanded area compared to the predetermined zone, wherein the result includes the identified emergency center; and in response to returning the result including the identified emergency center, performing an action that facilitates connecting the user device to the identified emergency center.

In some aspects, performing the action that facilitates connecting the identified emergency center to the user device to includes: causing display, on the user interface at the third-party device, a response and emergency contact information, wherein the response includes a location of the identified emergency center.

In some aspects, performing the action that facilitates connecting the identified emergency center to the user device to includes: establishing a communication session over a communication network between the user device and the identified emergency center.

In some aspects, receiving the signal indicative of the location of the user device includes: establishing a communication session over a communication network between the user device and the identified emergency center.

In some aspects, initiating the communication session between the user device and the third-party user device includes: initiating a chat session between the user device and the third-party user device.

In some aspects, initiating the communication session between the user device and the third-party user device includes: initiating a chat session between the user device and the third-party user device; detecting an event indicative of an absence in communication with the user device; in response to the event indicative of the absence in communication with the user device, initiating a shadow chat session that supplements the chat session with communications generated by an artificial intelligence model; and presenting shadow content of the shadow chat session and third-party content the chat session in a common chat window on the user interface of the third-party device.

In some aspects, the message signal is a text input at the user device and presented in a chat session on the user interface of the third-party device, and wherein the message signal includes content indicative of harm to the user or caused by the user of the user device.

In some aspects, the message signal is a text input at the user device and presented in a chat session on the user interface of the third-party device, and wherein the message signal includes content indicative of harm to the user or caused by the user of the user device.

In some aspects, the message signal is a video signal captured at the user device and presented on the user interface at the third-party device, and wherein the message signal includes content indicative of harm to the user or caused by the user of the user device.

In some aspects, the method further includes, prior to generating the emergency signal: receiving an input on the user interface at the third-party device to trigger an emergency procedure; and in response to the input at the third-party device, initiating the emergency procedure including generation of the emergency signal.

In some aspects, ascertaining distances from locations of emergency services to the location of the user device includes: in response to the emergency signal, querying a database for emergency services geographically nearest the location of the user device, wherein the emergency database stores contact information for multiple emergency services located in various geographical areas, and wherein a result that satisfies the query is restricted to a set of emergency services located within a predetermined area including the location of the user device.

In some aspects, the techniques described herein relate to a non-transitory, computer-readable storage medium including instructions recorded thereon, wherein the instructions, when executed by at least one data processor of a system, cause the system to: initiate a communication session between user device and third-party user device, wherein the communication session includes a message indicating that a user of the user device is at risk of an emergency; generate an emergency signal in response to an input at the third-party device that the user is at risk of the emergency; in response to the emergency signal, ascertain distances from locations of emergency services to the location of the user device, wherein a set of emergency services are identified as having emergency centers nearest the location of the user device, and wherein the set of emergency services is restricted to a predetermined area including the location of the user device; rank the set of emergency services based on a geographic proximity to the predetermined area including the location of the user device, wherein the set of emergency services are ranked based on a respective nearest distance to the location of the user device; cause the third-party device to present, on a user interface, the ranked set of emergency services; and perform an action that facilitates connecting an identified emergency center of a particular emergency service of the ranked set of emergency services to the user device.

In some aspects, to ascertain distances from locations of emergency services to the location of the user device includes: in response to failing to identify a first emergency center in a predetermined zone of the predetermined area, iteratively change or expand predetermined zones associated with the location of the first user device, wherein next predetermined zones have areas different from a prior area of previously searched predetermined zones; return a result that is restricted to an expanded area compared to the predetermined zone, wherein the result includes the identified emergency center; and in response to returning the result including the identified emergency center, perform an action that facilitates connecting the user device to the identified emergency center.

In some aspects, the techniques described herein relate to a non-transitory, computer-readable storage medium, wherein to perform the action that facilitates connecting the identified emergency center to the user device to includes: cause display, on the user interface at the third-party device, a response and emergency contact information, wherein the response includes a location of the identified emergency center.

In some aspects, performing the action that facilitates connecting the identified emergency center to the user device to includes: establish a communication session over a communication network between the user device and the identified emergency center.

In some aspects, receiving the signal indicative of the location of the user device includes: establish a communication session over a communication network between the user device and the identified emergency center.

In some aspects, the techniques described herein relate to a system, including: at least one hardware processor; and at least one non-transitory memory storing instructions, which, when executed by the at least one hardware processor, cause the system to: initiate a communication session between user device and third-party user device, wherein the communication session includes a message indicating that a user of the user device is at risk of an emergency; generate an emergency signal in response to an input at the third-party device that the user is at risk of the emergency; in response to the emergency signal, ascertain distances from locations of emergency services to the location of the user device, wherein a set of emergency services are identified as having emergency centers nearest the location of the user device, and wherein the set of emergency services is restricted to a predetermined area including the location of the user device; rank the set of emergency services based on a geographic proximity to the predetermined area including the location of the user device, wherein the set of emergency services are ranked based on a respective nearest distance to the location of the user device; cause the third-party device to present, on a user interface, the ranked set of emergency services; and perform an action that facilitates connecting an identified emergency center of a particular emergency service of the ranked set of emergency services to the user device.

In some aspects, to initiate the communication session between the user device and the third-party user device includes: initiating a chat session between the user device and the third-party user device; detect an event indicative of an absence in communication with the user device; in response to the event indicative of the absence in communication with the user device, initiate a shadow chat session that supplements the chat session with communications generated by an artificial intelligence model; and present shadow content of the shadow chat session and third-party content the chat session in a common chat window on the user interface of the third-party device.

In some aspects, the message signal is a text input at the user device and presented in a chat session on the user interface of the third-party device, and the message signal includes content indicative of harm to the user or caused by the user of the user device.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method for a third-party device to cause a user device to connect to an emergency service proximate to the user device in communication with the third-party device, the method comprising:

receiving a signal indicative of a location of the user device;

initiating a communication session between the user device and the third-party user device, wherein the communication session includes a message indicating that a user of the user device is at risk of an emergency;

generating an emergency signal in response to an input at the third-party device that the user is at risk of the emergency;

in response to the emergency signal, ascertaining distances from locations of emergency services to the location of the user device, wherein a set of emergency services are identified as having emergency centers nearest the location of the user device, and wherein the set of emergency services is restricted to a predetermined area including the location of the user device;

ranking the set of emergency services based on a geographic proximity to the predetermined area including the location of the user device, wherein the set of emergency services are ranked based on a respective nearest distance to the location of the user device;

causing the third-party device to present, on a user interface, the ranked set of emergency services; and performing an action that facilitates connecting an identified emergency center of a particular emergency service of the ranked set of emergency services to the user device.

2. The method of claim 1, wherein ascertaining distances from locations of emergency services to the location of the user device comprises:

in response to failing to identify a first emergency center in a predetermined zone of the predetermined area, iteratively changing or expanding predetermined zones associated with the location of the first user device, wherein next predetermined zones have areas different from a prior area of previously searched predetermined zones;

returning a result that is restricted to an expanded area compared to the predetermined zone, wherein the result includes the identified emergency center; and in response to returning the result including the identified emergency center, performing an action that facilitates connecting the user device to the identified emergency center.

3. The method of claim 1, wherein performing the action that facilitates connecting the identified emergency center to the user device to comprises:

causing display, on the user interface at the third-party device, a response and emergency contact information,

wherein the response comprises a location of the identified emergency center.

4. The method of claim 1, wherein performing the action that facilitates connecting the identified emergency center to the user device to comprises:

establishing a communication session over a communication network between the user device and the identified emergency center.

5. The method of claim 1, wherein receiving the signal indicative of the location of the user device comprises:

establishing a communication session over a communication network between the user device and the identified emergency center.

6. The method of claim 1, wherein initiating the communication session between the user device and the third-party user device:

initiating a chat session between the user device and the third-party user device.

7. The method of claim 1, wherein initiating the communication session between the user device and the third-party user device:

initiating a chat session between the user device and the third-party user device;

detecting an event indicative of an absence in communication with the user device;

in response to the event indicative of the absence in communication with the user device, initiating a shadow chat session that supplements the chat session with communications generated by an artificial intelligence model; and presenting shadow content of the shadow chat session and third-party content the chat session in a common chat window on the user interface of the third-party device.

8. The method of claim 1, wherein the message signal is a text input at the user device and presented in a chat session on the user interface of the third-party device, and wherein the message signal includes content indicative of harm to the user or caused by the user of the user device.

9. The method of claim 1, wherein the message signal is a text input at the user device and presented in a chat session on the user interface of the third-party device, and wherein the message signal includes content indicative of harm to the user or caused by the user of the user device.

10. The method of claim 1, wherein the message signal is a video signal captured at the user device and presented on the user interface at the third-party device, and wherein the message signal includes content indicative of harm to the user or caused by the user of the user device.

11. The method of claim 1 further comprising, prior to generating the emergency signal:

receiving an input on the user interface at the third-party device to trigger an emergency procedure; and in response to the input at the third-party device, initiating the emergency procedure including generation of the emergency signal.

12. The method of claim 1, wherein ascertaining distances from locations of emergency services to the location of the user device comprises:

in response to the emergency signal, querying a database for emergency services geographically nearest the location of the user device, wherein the emergency database stores contact information for multiple emergency services located in various geographical areas, and wherein a result that satisfies the query is restricted to a set of emergency services located within a predetermined area including the location of the user device.

13. A non-transitory, computer-readable storage medium comprising instructions recorded thereon, wherein the instructions, when executed by at least one data processor of a system, cause the system to:

initiate a communication session between user device and third-party user device, wherein the communication session includes a message indicating that a user of the user device is at risk of an emergency;

generate an emergency signal in response to an input at the third-party device that the user is at risk of the emergency;

in response to the emergency signal, ascertain distances from locations of emergency services to the location of the user device, wherein a set of emergency services are identified as having emergency centers nearest the location of the user device, and wherein the set of emergency services is restricted to a predetermined area including the location of the user device;

rank the set of emergency services based on a geographic proximity to the predetermined area including the location of the user device, wherein the set of emergency services are ranked based on a respective nearest distance to the location of the user device;

cause the third-party device to present, on a user interface, the ranked set of emergency services; and perform an action that facilitates connecting an identified emergency center of a particular emergency service of the ranked set of emergency services to the user device.

14. The non-transitory, computer-readable storage medium of claim 13, wherein to ascertain distances from locations of emergency services to the location of the user device comprises:

in response to failing to identify a first emergency center in a predetermined zone of the predetermined area, iteratively change or expand predetermined zones associated with the location of the first user device, wherein next predetermined zones have areas different from a prior area of previously searched predetermined zones;

return a result that is restricted to an expanded area compared to the predetermined zone, wherein the result includes the identified emergency center; and in response to returning the result including the identified emergency center, perform an action that facilitates connecting the user device to the identified emergency center.

15. The non-transitory, computer-readable storage medium of claim 13, wherein to perform the action that facilitates connecting the identified emergency center to the user device to comprises:

cause display, on the user interface at the third-party device, a response and emergency contact information, wherein the response comprises a location of the identified emergency center.

16. The non-transitory, computer-readable storage medium of claim 13, wherein performing the action that facilitates connecting the identified emergency center to the user device to comprises:

establish a communication session over a communication network between the user device and the identified emergency center.

17. The non-transitory, computer-readable storage medium of claim 13, wherein receiving the signal indicative of the location of the user device comprises:

establish a communication session over a communication network between the user device and the identified emergency center.

18. A system, comprising:

at least one hardware processor; and at least one non-transitory memory storing instructions, which, when executed by the at least one hardware processor, cause the system to:

initiate a communication session between user device and third-party user device, wherein the communication session includes a message indicating that a user of the user device is at risk of an emergency;

generate an emergency signal in response to an input at the third-party device that the user is at risk of the emergency;

in response to the emergency signal, ascertain distances from locations of emergency services to the location of the user device, wherein a set of emergency services are identified as having emergency centers nearest the location of the user device, and wherein the set of emergency services is restricted to a predetermined area including the location of the user device;

rank the set of emergency services based on a geographic proximity to the predetermined area including the location of the user device, wherein the set of emergency services are ranked based on a respective nearest distance to the location of the user device;

cause the third-party device to present, on a user interface, the ranked set of emergency services; and perform an action that facilitates connecting an identified emergency center of a particular emergency service of the ranked set of emergency services to the user device.

19. The system of claim 18, wherein to initiate the communication session between the user device and the third-party user device:

initiating a chat session between the user device and the third-party user device;

detect an event indicative of an absence in communication with the user device;

in response to the event indicative of the absence in communication with the user device, initiate a shadow chat session that supplements the chat session with communications generated by an artificial intelligence model; and present shadow content of the shadow chat session and third-party content the chat session in a common chat window on the user interface of the third-party device.

20. The system of claim 18, wherein the message signal is a text input at the user device and presented in a chat session on the user interface of the third-party device, and wherein the message signal includes content indicative of harm to the user or caused by the user of the user device.

* * * * *